(No Model.)

L. K. FULLER.
REED ORGAN.

No. 502,666. Patented Aug. 1, 1893.

Witnesses
Jos. S. Latimer
Carleton E. Snell

Inventor
Levi K. Fuller
by his Attorney (No Model.) 3 Sheets—Sheet 2.

L. K. FULLER.
REED ORGAN.

No. 502,666. Patented Aug. 1, 1893.

Witnesses
Jos. S. Latimer
Carleton E. Snell

Inventor
Levi K. Fuller
by Arthur L. Browne
his Attorney (No Model.)
L. K. FULLER.
REED ORGAN.
No. 502,666.
3 Sheets—Sheet 3.
Patented Aug. 1, 1893.
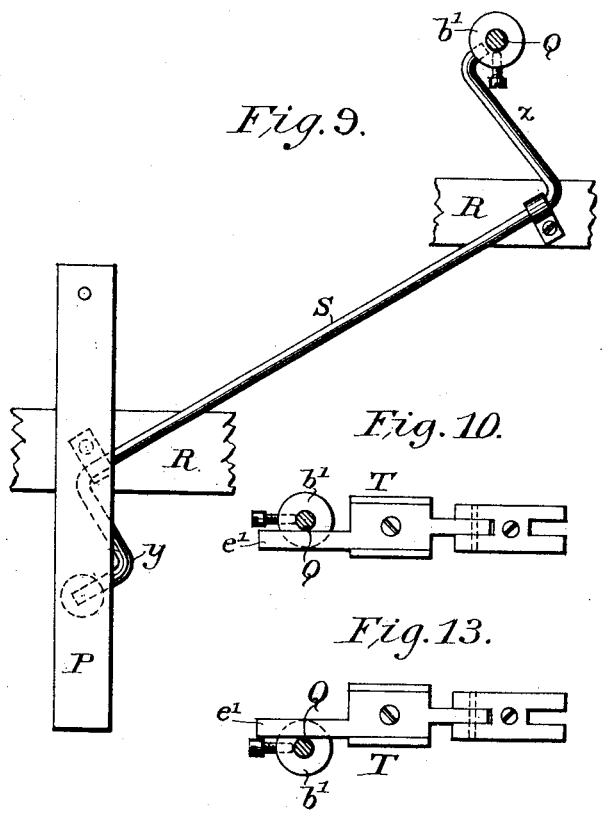
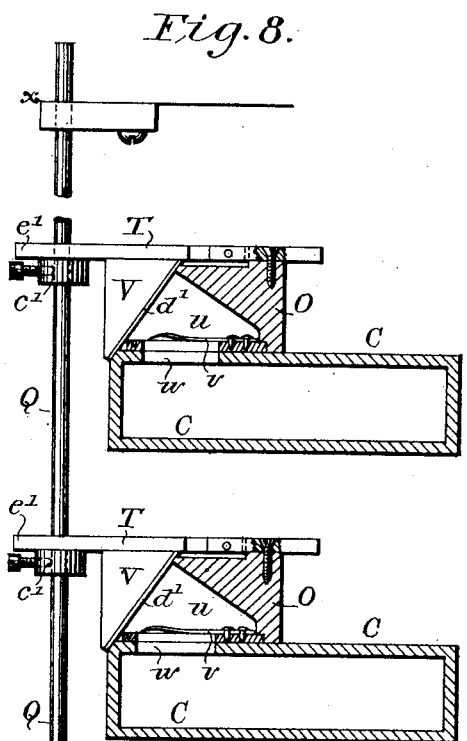
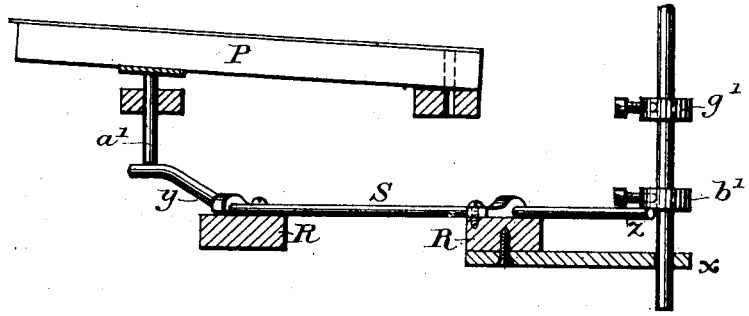
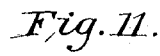
Witnesses
Jos. S. Lattimer
Carleton E. Snell
Inventor
Levi K. Fuller
by
his Attorney

UNITED STATES PATENT OFFICE.

LEVI K. FULLER, OF BRATTLEBOROUGH, VERMONT, ASSIGNOR TO THE ESTEY ORGAN COMPANY, OF SAME PLACE.

REED-ORGAN.

SPECIFICATION forming part of Letters Patent No. 502,666, dated August 1, 1893.

Application filed April 4, 1893. Serial No. 468,978. (No model.)

*To all whom it may concern:*

Be it known that I, LEVI K. FULLER, of Brattleborough, in the county of Windham and State of Vermont, have invented certain new and useful Improvements in Reed-Organs, of which the following is a specification.

The present invention consists in certain improvements upon that class of reed organs wherein there are two vertical main wind conductors at opposite ends of the organ-case which communicate at their lower ends with the bellows chamber, and horizontal wind chests or resonance chambers which extend between the wind conductors and communicate therewith, said wind chests supporting the reed-sets. This class of reed organs is illustrated for example in Letters Patent of the United States No. 164,900, granted June 29, 1875, to Nicolas S. Bach and Martin P. Berg.

The improvements upon this class of organs constituting the present invention consist in the construction of the bellows and the connection thereof with the vertical wind conductors; in a horizontal transverse wind conductor connecting the upper ends of the two vertical wind conductors; in the connections between the main vertical wind conductors and the horizontal wind chests or resonance chambers including the mutes and their operating mechanism; and in the valves for the reed cells and the connecting or action devices between them and the keys.

The present improvements are illustrated in the accompanying drawings, wherein—

Figure 1:
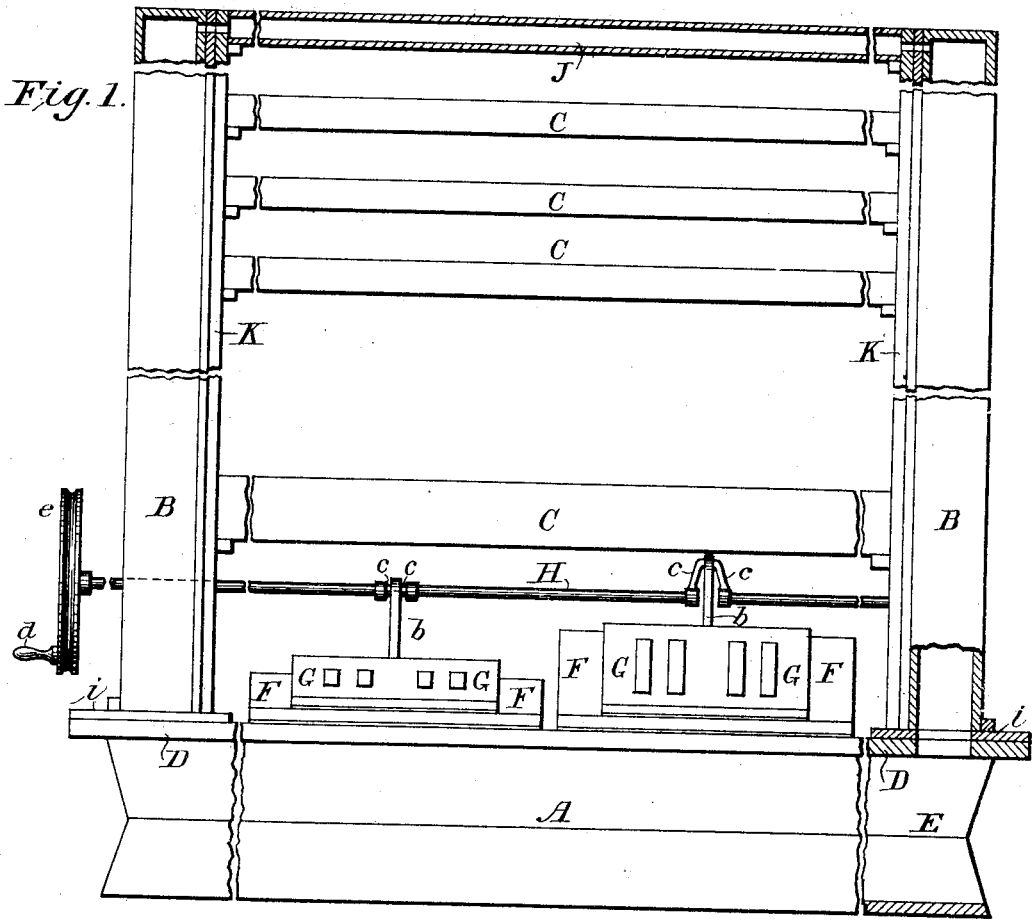
Figure 2:
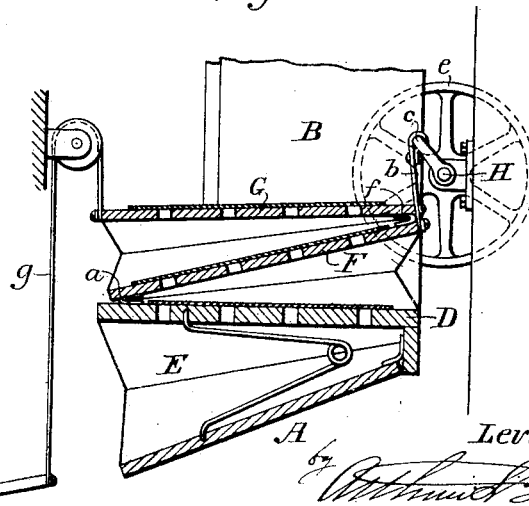
Figure 3:
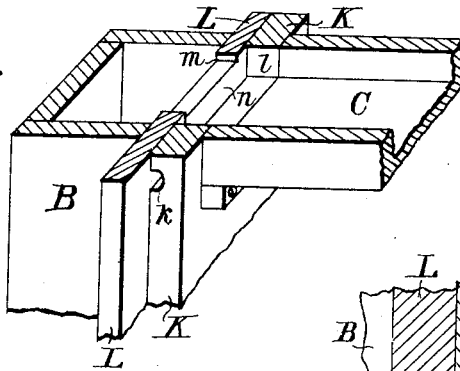
Figure 5:
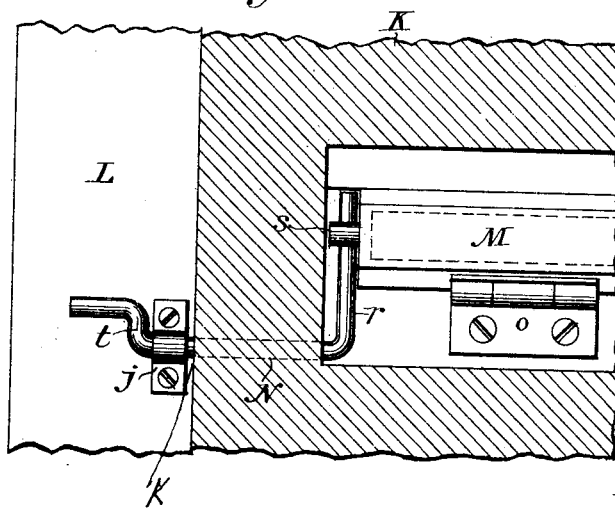
Figure 6:
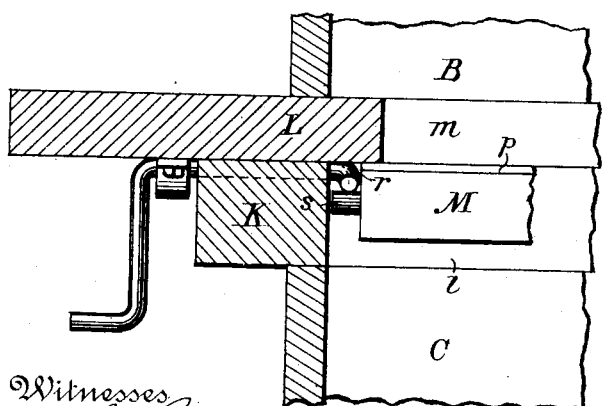
Figure 4:
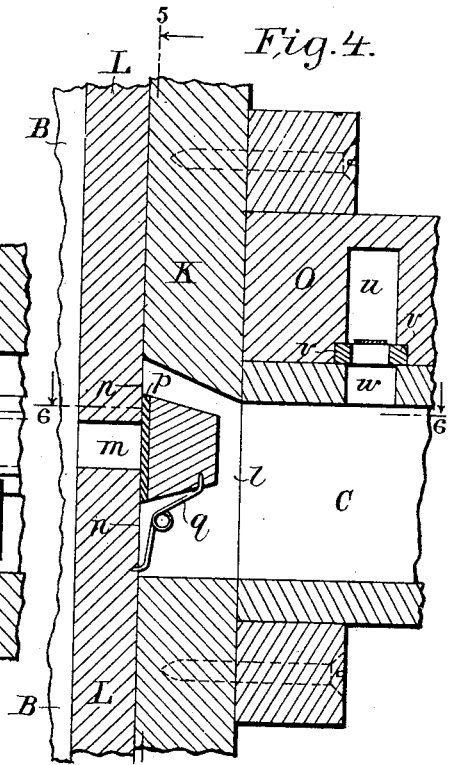
Figure 7:
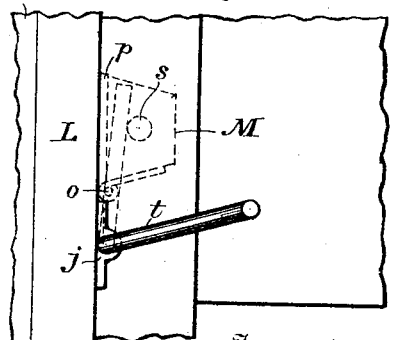

Figure 1, is a front elevation, partly in section, of the bellows, the main wind conductors, and the wind chests or resonance chambers. Fig. 2, is a vertical cross-section through the bellows. Fig. 3, is a fragmentary perspective view of a portion of one of the wind conductors and of one of the wind chests. Fig. 4, is a vertical longitudinal section through a portion of one of the wind conductors and a portion of one of the wind chests. Fig. 5, is a cross section (in a plane indicated approximately by the line 5—5 in Fig. 4) through a portion of a mute frame intermediate between the wind conductor and the wind chests, looking toward the wind conductor and showing one of the mutes. Fig. 6, is a horizontal cross section in a plane indicated by the line 6—6 in Fig. 4. Fig. 7, is a face view of the parts shown in Fig. 4. Fig. 8, is a vertical cross section through the wind chests, illustrating the reed valve mechanism and the action. Fig. 9, is a detail plan view of the action mechanism between a key and a reed valve mechanism. Fig. 10 is a plan view of one of the reed valves. Fig. 11, is a plan view and Fig. 12, a side view of a modification of the reed valve operating mechanism. Fig. 13, is a plan view of a further modification of the reed valve operating mechanism.

Referring first to Figs. 1 and 2, A, is the bellows; B, B, the main vertical wind conductors; and C, C, the horizontal wind chests. These several parts are shown broken away in the drawings to indicate that the wind conductors may be of any desired height, and the wind chests may be of any desired length and of any desired number. The bellows foundation D extends substantially horizontally, so that the bellows chamber E beneath it extends horizontally; and *i i* are reinforcing plates at the opposite ends of the foundation D for the throats of the bellows, upon which plates the vertical wind conductors rest and through openings in which the wind conductors communicate with the bellows chamber. This construction brings the bellows chamber entirely beneath the wind conductors, thus securing a compact arrangement and enabling a large number of wind chests and sets of reeds to be employed without making the organ unduly high.

The main novelty of the bellows resides in its exhausters. There are two pairs of exhausters located above the foundation and between the main wind conductors, each pair consisting of two independent exhausters F and G. Each inner exhauster F is hinged by a hinge *a* at its front edge to the bellows foundation D, and is connected at its free rear edge by a strap or other pitman *b* to a crank *c* on a horizontal shaft H, which is journaled in suitable bearings back of the conductors B B. Or the shaft H, may extend through the conductors B, B. One end of the shaft H extends outside of the organ casing and has an operating handle *d*, by means of which the exhausters F F may be operated by hand. The external fly-wheel $e$ may be connected with any source of power so that the exhausters F F may be power driven.

Instead of an operating shaft H, a lever projecting at one side of the organ casing may be employed for operating the exhausters F F, as in Letters-Patent of the United States No. 174,223, granted to me February 29, 1876. The cranks $c\,c$ for the two exhausters F F are arranged at an angle to each other so that the two exhausters operate alternately. Each of the outer exhausters G is hinged by hinge $f$ at its rear edge to the rear free edge of the corresponding inner exhauster F, and its free front edge is connected by a strap $g$ in the usual manner to one of the blow pedals I. The exhausters F and G are closed or collapsed in the usual manner by springs which are so well known that they are not illustrated in the drawings. In case rigid pitmen $b$ are employed, no collapsing springs are necessary for the inner exhausters F, F. The multiple exhausters F and G are entirely independent of each other. This arrangement it will be noted, is an exceedingly compact one, since they take no more room than single exhausters would. At their upper ends the vertical wind conductors B B are connected by a transverse wind conductor J, which is in constant communication with the two vertical wind conductors, and which establishes constant communication between the two vertical wind conductors at their upper ends. This transverse wind conductor equalizes the air pressure in the two vertical wind conductors, adds to the resonance of the organ, and improves the speaking qualities of the reeds. The ends of the wind chests C C are not fastened directly to the wind conductors B, B, but are secured to mute frames K K, which lie between them and the wind conductors.

Figs. 3, 4, 5, 6, and 7, illustrate in detail the connections between one of the vertical wind conductors B, and one of the horizontal wind chests C, and the construction and operating mechanism of the mute which controls the passage of air from the wind chest C to the wind conductor B.

The mute frame K, is a board which lies between the face L of the wind conductor B, and the end of the wind chest C. The mute frame has a slot or opening $l$ therein, of an area substantially equal to that of the interior of the wind chest in cross section, as shown in Figs. 3, 4, and 6. Opposite the slot or opening $l$ in the mute frame, the front face L of the wind conductor has an air port $m$ which is both shorter and narrower than the slot or opening $l$, whereby a margin or seat $n$ is provided on the face L surrounding the air port $m$. The wind conductor B, and wind chest C thus communicate through the slot $l$ and air-port $m$, and this communication is controlled by a swinging hinged mute M, which is hinged by a hinge $o$ (or hinges, since there are preferably two hinges one near each end of the mute) to the front face L of the wind conductor below the air port $m$, the mute being thus located within the slot or opening $l$ in the mute frame K. The inner face $p$ of the mute is suitably felted or padded, and this felted face is both longer and wider than the air port $m$ so that when the mute is seated (as it normally is) against the margin or seat $n$, it entirely closes and stops the air port $m$ so that no air can pass from the wind chest C to the wind conductor B, and consequently none of the reeds in communication with this end of the wind chest C can sound. The mute is thus held in its normally closed position by a spring $q$.

In order to swing the mute downwardly and thus permit the reeds controlled by it to sound, an operating mechanism is provided. An oscillating shaft N extends in a direction parallel with the mute through an aperture $k$ at the inner face of the mute frame K, which aperture is in line with the lower portion of the slot or opening $l$ in the mute frame. Just within the slot or opening $l$, the shaft N has a crank-arm $r$ extending vertically with its upper end between the margin or seat $n$ of face L and a projecting part (such as a peg or stud $s$) on the mute M. Outside of the mute frame K, the shaft N has an operating crank arm $t$. The shaft N is held from longitudinal displacement, and is secured and mounted in place to the face L, by a cleat $j$. By depressing the outer crank-arm $t$, the inner crank-arm $r$ is swung outwardly, thus opening the mute M. The movement of the crank-arm $t$ is controlled by one of the organ stops which is connected therewith in any well-known way. The aperture $k$ through which shaft N passes may be felted to render the shaft noiseless, and to prevent any leakage of air.

In Fig. 4 are shown a portion of one of the reed sets O, one reed cell $u$, and a reed $v$, which are of the usual construction such as have been long employed in the "Estey" organs. The reed set O, rests directly upon the top of the wind chest C, and said top has slots $w$ which register with the reed cells $u$. The reed cells are hence in constant communication with the wind chest or resonance chamber C. All of the other mutes in the organ are similar in construction and arrangement to the mute M. This construction and arrangement is efficient, durable, economical, and practical.

In putting the organ together, the mutes and their operating shafts N are first secured to the front face L of the vertical wind conductor. The mute frame K, is then put into place, its apertures $l$ coinciding with and overlying the mutes, and its apertures $k$ overlying the shafts N. The reed sets are connected with the wind-chests which are then put in place, and without endangering the mutes since the latter are entirely protected by the mute frames. The mutes are swinging or hinged mutes which experience has demonstrated to be the best, since they can be opened to different extents by the action of different stops, and to whatever extent they are opened the opening extends throughout the length thereof, which being substantially equal to the width of the wind chest insures the proper passage of the air therethrough. The operating mechanism of each mute connecting the same with its stop or stops, comprising an oscillating shaft N as the only part which extends from the interior of the wind-chest to the outer air, can be readily made air-tight and kept so by felting the aperture $k$, there being no tendency in the operation of the shaft N to displace the felting.

The operating mechanism, or action, intermediate between each key and its corresponding reeds, is illustrated in Figs. 8, 9, and 10. To each key P, of the key-board (or of the key-boards if more than one manual is employed), there is a vertically-extending longitudinally-movable action wire or rod Q, which is located directly in front of all of the wind chests C and is mounted so as to be capable of a vertical movement in suitable guides $x$ $x$ secured to any convenient fixed parts of the organ. The key P on its depression may lift the action-rod Q by any suitable intervening instrumentalities, but since the total length of a reed set ordinarily exceeds the length of the key-board, I prefer to employ the devices shown in Figs. 8 and 9. Journaled upon conveniently disposed rails R R, is a horizontally-extending rocking or oscillating shaft S, having a front crank-arm $y$ and a rear crank-arm $z$. The front crank-arm $y$ is normally elevated and its outer end is in the path of a tracker pin $a'$ which is acted upon directly by the key P, and which is guided and constructed in the usual well-known manner. The outer end of the rear normally-depressed crank-arm $z$ is in close proximity to the action-rod Q, which is provided with an adjustable button, collar, sleeve or projection $b'$ which is preferably so adjusted as to rest upon the crank-arm $z$ so that the crank-arm $z$ sustains the weight of the action-rod Q and all parts carried thereby. The weight of the action-rod thus serves to keep the key P normally elevated and the shaft S in its normal position, and to restore said key and shaft to their normal positions when moved therefrom in the act of playing the organ. Above the button $b'$, the action-rod Q carries as many adjustable laterally-extending lifters $c'$ (which are or may be constructed like the button $b'$) as there are wind-chests C with which the action-rod Q co-operates. Each of these lifters $c'$ co-operates with a valve V, which normally closes or stops the opening to one of the reed cells $u$. The valve V has an inclined felted face $d'$ which seats against the inclined face of the reed set covering the reed cell opening. The valve V is secured to a horizontally-extending lever T, which is pivoted at its rear ends to the reed set. At the front end the lever has a forwardly-extending operating projection $e'$, at one side of the center of the valve V and parallel with the plane in which the valve swings, which extends alongside and forward of the action-rod Q and over one of the lifters $c'$. When the key is depressed, all of the valves V co-operating with the action-rod Q are lifted, thus opening the corresponding reed cells of all the tiers of the reeds, whereby those reeds will sound whose wind-chests have their mutes open. On lifting the finger from the key, the action-rod Q drops down by its own weight, (or, if necessary, reinforced by the action of a light spring suitably arranged) thus permitting the valves V to close. By placing the projection $e'$ at one side, the action-rod Q lies directly in front of the reed cells and is brought close to the valves thus providing a compact arrangement. This necessitates, however, removing the action-rod Q from its guides $x$ $x$ when the reeds are to be removed for cleaning or for other purposes. Each action-rod may, however, be located just opposite the spaces between adjacent reeds, as shown in Fig. 13, so that the reeds may be removed without dislocating the action rods. With the modification shown in Fig. 13, the action-rod may be lifted so high as to permit the opening of the valves wide enough to remove the reeds, and be held in this uplifted position by adjusting the button $b'$.

A further modification is shown in Figs. 11 and 12, wherein the adjustable lifter $c^2$ has a rearwardly-extending projection $f'$ upon which the front end of the valve projection $e'$ rests, the projection $f'$ in this case being centrally arranged, and the action-rod being wholly in front of the valve V, its lever T, and projection $e'$. The rear crank-arm $z$ of the action rock-shaft S is longer than the front crank-arm $y$, so that a slight movement of the key suffices to open the valves V. The action-rod has a second button $g'$ above button $b'$, which can be employed in connection with an octave coupler mechanism and for further weighting the action-rod.

I am aware that it is not new to provide a vertically-movable action-rod with adjustable lifters for simultaneously lifting a plurality of external reed valves, such a construction being shown, for example, in Letters-Patent of the United States No. 437,131, granted to Jarvis Peloubet September 23, 1890. The principal utility of the arrangement I have shown lies in its relation to the wind chests and to the mutes thereof. Each wind-chest provides a resonance chamber which is entirely unobstructed by any mechanism, whether reed valves, mutes, or other mechanism, thereby insuring purity and sweetness of tone. The bottom of each wind-chest is also entirely free, being unconnected with any movable part, so that it constitutes in effect a sounding board. The wind conductors B, B, are also wholly unobstructed by any mute or valve operating mechanism.

I claim as my invention—

1. The main wind-conductors, and the wind-chests connected therewith, in combination with the bellows with which each of said main wind-conductors near one end connects, and the transverse open wind-conductor connecting the said main wind-conductors near their other ends, substantially as set forth.

2. The horizontal bellows foundation, the bellows chamber below the same, and the vertically-extending main wind conductors rising from near the opposite ends of said bellows foundation and communicating with said bellows chamber, in combination with the exhausters located above said bellows foundation and between said main wind conductors, substantially as set forth.

3. The horizontal bellows foundation, and the bellows chamber below the same, in combination with the reinforcing plates above and at the opposite ends of said bellows foundation, and the vertically-extending main wind conductors resting upon said reinforcing plates and communicating therethrough and through the bellows foundation with the bellows chamber, substantially as set forth.

4. The bellows foundation, the bellows chamber on one side thereof, and the independently-operating multiple exhausters on the opposite side thereof, in combination with the blow-pedals connected with a portion of said exhausters, and an operating mechanism independent of said blow-pedals connected with other of said exhausters, substantially as set forth.

5. A bellows foundation, in combination with a pair of exhausters, the inner of said exhausters being hinged at one edge to said foundation, and the outer of said exhausters being hinged to the free edge of the inner exhauster, and independent means for operating said inner and outer exhausters, substantially as set forth.

6. A horizontal bellows foundation, a bellows chamber below the same, and vertical wind conductors rising from opposite ends of said foundation and communicating with said bellows chamber, in combination with two pairs of exhausters, each pair comprising an inner exhauster hinged at its front edge to said foundation and an outer exhauster hinged at its rear edge to the rear free edge of said inner exhauster, blow pedals connected with the free front edges of said outer exhausters, and a rotary horizontal operating shaft having cranks connected with the free rear edges of the inner exhausters, substantially as set forth.

7. A wind conductor having an air port or opening, and a wind chest, in combination with a mute frame between the wind conductor and the wind chest, said mute frame having a slot or opening establishing communication from the vertical wind conductor to the wind chest, substantially as set forth.

8. A wind conductor having an air port in its face, and a wind chest, in combination with a mute frame between the wind conductor and wind chest and having a slot or opening opposite the air port in the face of said wind conductor, whereby communication is established between said wind conductor and the interior of said wind chest, and a mute controlling said air port and located in the slot or opening in said mute frame, substantially as set forth.

9. A wind conductor having an air port in its face, and a wind chest, in combination with a mute frame between the wind conductor and wind chest and having a slot or opening opposite the air port in the face of said wind conductor, whereby communication is established between said wind conductor and the interior of said wind chest, and a swinging mute controlling said air port and located in the slot or opening in said mute frame, substantially as set forth.

10. A wind conductor having an air port in its face, and a wind chest, in combination with a mute frame between the wind conductor and wind chest and having a slot or opening opposite the air port in the face of said wind conductor, whereby communication is established between said wind conductor and the interior of said wind chest, and a swinging mute controlling said air port, said mute being pivoted to the face of the wind conductor adjacent to said air port and being located and swinging in said slot or opening in said mute frame, substantially as set forth.

11. A wind conductor having an air port in its face, and a wind chest, in combination with a mute frame between the wind conductor and wind chest and having a slot or opening opposite the air port in the face of said wind conductor, whereby communication is established between said wind conductor and the interior of said wind chest, a swinging mute controlling said air port, said mute being pivoted to the face of the wind conductor adjacent to said air port, and located and swinging in said slot or opening in said mute frame, and an oscillating shaft connected with said mute to swing the same, said shaft being secured to the face of the wind conductor and extending outside of the mute frame, substantially as set forth.

12. A wind conductor having an air port in its face, and a wind chest, in combination with a mute frame between the wind conductor and wind chest and having a slot or opening opposite the air port in the face of said wind conductor, whereby communication is established between said wind conductor and the interior of said wind chest, a swinging mute controlling said air port, said mute being pivoted to the face of the wind conductor adjacent to said air port and located and swinging in said slot or opening in said mute frame, and said mute having at one end a projecting stud $s$, an oscillating operating shaft $N$ lying alongside the face of the wind conductor and extending through an opening $k$ in the mute frame, said shaft having within the slot or opening of the mute frame a crank-arm $r$ co-operating with the stud $s$ on the mute, and having exterior to the mute frame an operating crank-arm $t$, substantially as set forth.

13. A wind conductor having a plurality of air ports in its face, a plurality of swinging mutes controlling said air ports respectively, each mute being pivoted to the face of the wind conductor below its corresponding air port, and a plurality of oscillating operating shafts one for each mute, each shaft being mounted upon the face of the wind conductor, in combination with a mute frame having a plurality of slots or openings $l$, and a plurality of apertures $k$, whereby said mute frame may be placed against the face of the wind conductor, each of its slots or openings $l$ overlying one of the mutes, and each of its apertures $k$ overlying one of the operating shafts, substantially as set forth.

14. A wind conductor having an air port, and a wind chest communicating with said conductor through said air port, in combination with a swinging mute controlling said air port, substantially as set forth.

15. A wind conductor the inclosed chamber of which is wholly unobstructed, said wind conductor having an air port, a wind chest the inclosed chamber of which is wholly unobstructed, a mute frame between said wind conductor and wind chest having a slot or opening opposite said air port establishing communication between said wind conductor and wind chest, and a mute controlling said air port and located within the slot or opening in said mute frame, in combination with a reed set exterior to said wind chest, the reed cells whereof communicate with said wind chest, external valves for the reed cells, and actions for said valves wholly disconnected from said wind chest, substantially as set forth.

16. A wind chest, a reed set exterior thereto, and a valve for each reed cell pivoted to the reed set, in combination with a longitudinally-movable action-rod, and an adjustable lifter on said action-rod co-operating with said valve, substantially as set forth.

17. A wind chest, a reed set external thereto, and a valve for each reed cell pivoted to the reed set, said valve having a forwardly-extending operating projection, in combination with a longitudinally-movable action-rod located in front of said valve with the operating projection thereof extending in front of said action-rod, and a laterally-extending lifter on said action-rod co-operating with said projection, substantially as set forth.

18. A reed set, and a valve for each reed cell pivoted to the reed set, said valve having at one side a forwardly-extending operating projection which extends in a plane parallel with that in which the valve swings, in combination with an action-rod located in front of the reed set but between adjacent reed cells and at one side of its valve, said action-rod having a laterally-extending lifter co-operating with the operating projection of the valve, substantially as set forth.

In witness whereof I have hereunto signed my name in the presence of two subscribing witnesses.

LEVI K. FULLER.

Witnesses:
L. W. HAWLEY,
C. N. MORAN.